United States Patent [19]

Arnold

[11] 4,070,921
[45] Jan. 31, 1978

[54] SCREW SPINDLE

[76] Inventor: Franz Arnold, Spatzenweg 20, 8960 Kempton, Germany

[21] Appl. No.: 734,645

[22] Filed: Oct. 21, 1976

[30] Foreign Application Priority Data

Oct. 28, 1975  Germany .................. 7534177[U]
Oct. 28, 1975  Germany .................. 7534145[U]

[51] Int. Cl.² .................. F16H 25/22; F16H 1/18
[52] U.S. Cl. .................. 74/459; 308/6 C; 308/189 R
[58] Field of Search .......... 308/6 R, 6 C, 189 R, 308/190, 185, 205; 74/459, 464

[56] References Cited

U.S. PATENT DOCUMENTS

| | | | |
|---|---|---|---|
| 3,186,250 | 6/1965 | Boutwell | 74/459 |
| 3,234,810 | 2/1966 | Orner | 74/459 |
| 3,372,605 | 3/1968 | Orner | 74/459 |
| 3,638,507 | 2/1972 | Orner | 74/459 |
| 3,673,886 | 7/1972 | Tomita | 74/459 |

FOREIGN PATENT DOCUMENTS 1,625,526  5/1972  Germany.
2,031,390  1/1971  Germany.

Primary Examiner—Richard A. Bertsch
Attorney, Agent, or Firm—Blanchard, Flynn, Thiel, Boutell & Tanis

[57] ABSTRACT

A screw spindle drive comprising a spindle with one or more thread grooves of circular cross-section, a nut with a complimentary groove or grooves, and a closed ring of balls in each raceway formed by a groove in the spindle and a corresponding groove in the nut has the pitch of each raceway less than the product of the ball diameter and the number of raceways. The thread grooves have a radius of curvature equal to that of the balls but their depth is less than this radius. A return groove in the nut has only to be deep enough to allow the balls to ride over the ridge between turns of the thread groove. The balls can be held by permanent or temporary cages for ease of assembly.

11 Claims, 14 Drawing Figures

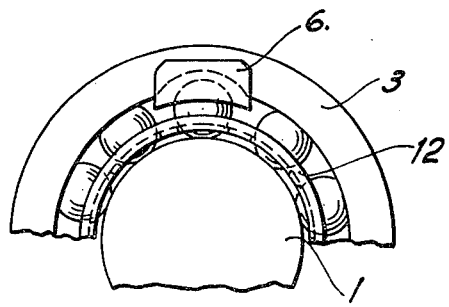
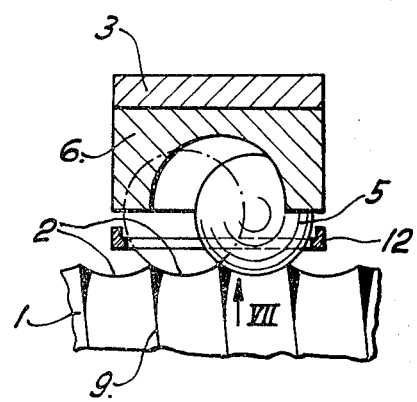
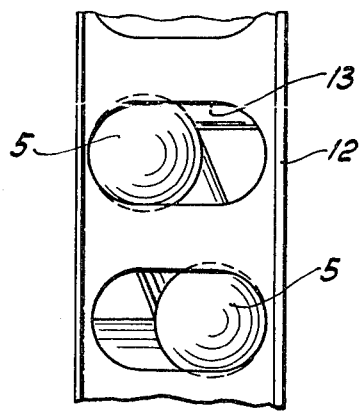
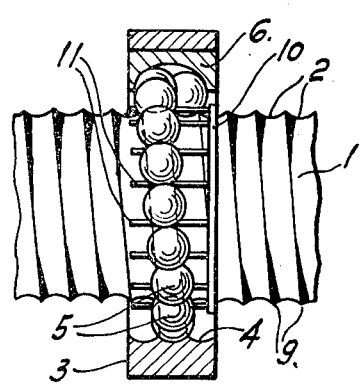
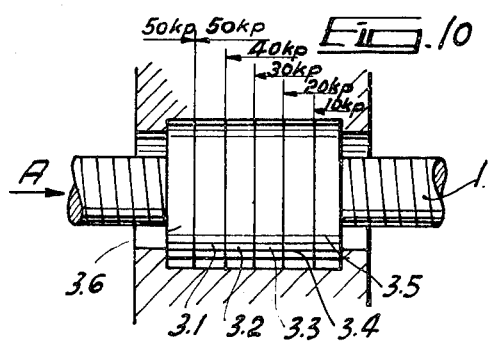
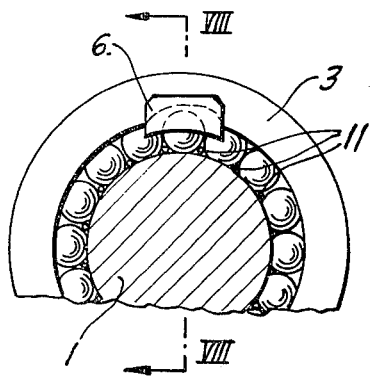

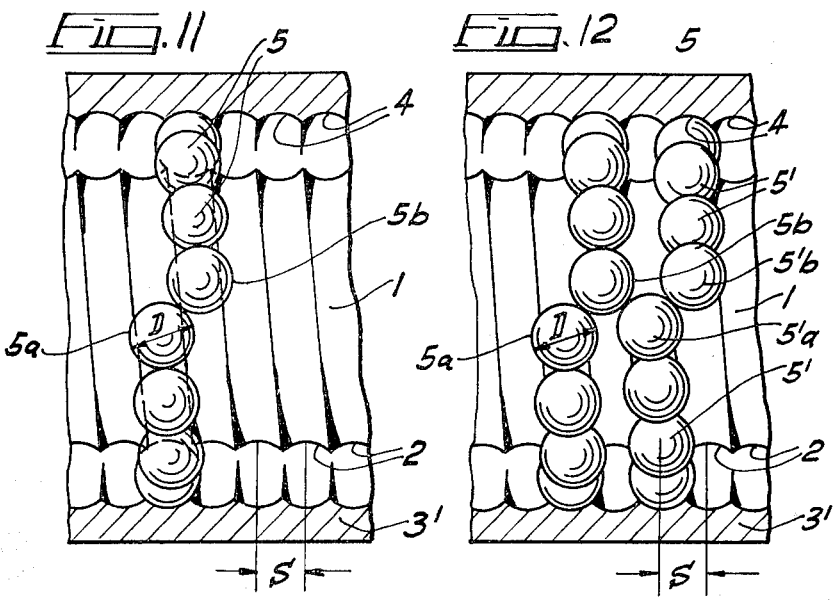
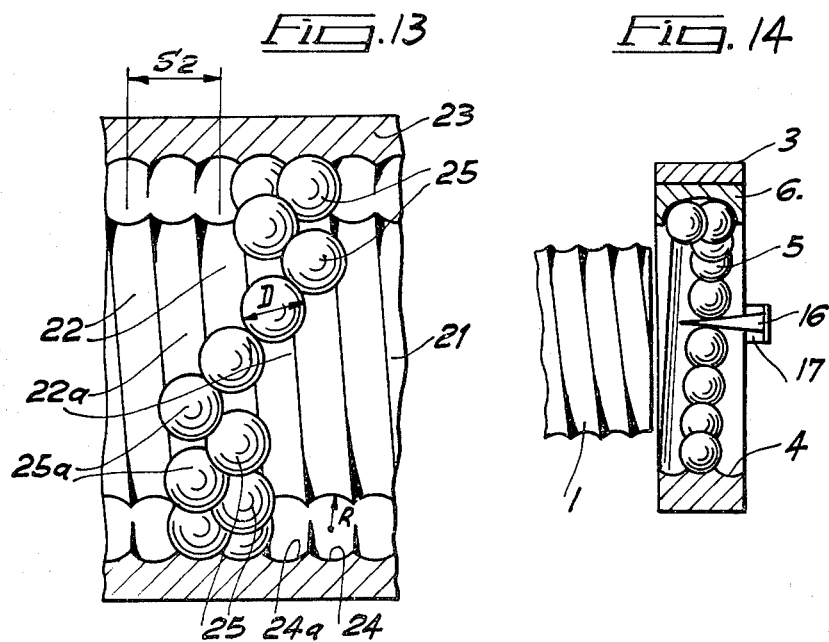

SCREW SPINDLE

FIELD OF THE INVENTION

The invention relates to a screw spindle drive consisting of a screw spindle with thread grooves of circular cross-section, a nut with complementary thread grooves, and balls disposed at any given time in the form of a closed ring in the ball raceway formed by the thread grooves of the screw spindle and the nut.

BACKGROUND OF THE INVENTION

In such screw spindle drives that are known (for example, from German Auslegeschrift No. 1,625,526 or German Offenlegungsschrift No. 2,031,390), the pitch of the thread grooves of the screw spindle and nut is greater in each case than the diameter of the balls. This has the disadvantage that in the case of pitches which are to be smaller than a certain ball diameter, balls with a smaller diameter must also be employed in each case. Balls with a smaller diameter, however, have a lower load-bearing capacity because of their higher contact pressure.

Many screw spindle drives have a so-called ball return means by which the balls are carried back again across one or more thread grooves into the preceding thread grooves. Such ball return means, however, increase the external diameter of the nut. In the case of screw spindle drives which are intended only for a limited mutual axial movement, a ball return means can be dispensed with. However, precautions must then be taken so that the balls in a ring thereof do not move apart. Precautionary arrangements of this kind are, for example, a ball cage or retainer. If such a ball cage is absent, a stop projecting into the thread grooves of the nut must be provided at both ends of the latter the stop preventing the balls leaving the thread grooves of the nut. If, however, the balls are not held together by a ball cage, one or more balls come into abutment against the stop prematurely and can no longer roll in the thread grooves on further rotation of the nut or spindle. The easy mutual movement of the screw spindle and nut is thereby hampered and increased wear moreover occurs in consequence of sliding friction. Ball cages have the disadvantage of occasioning additional manufacturing costs, having a braking action in consequence of the friction of the balls on the ball cage and, moreover, being also subjected to wear because of this friction.

In the case of screw spindle drives having ball return means, the nut has an insert piece having a return passage open towards the spindle and by which the balls are returned to the preceding thread groove at any given time. In such case, the nut has a relatively large axial length and also a relatively large diameter, because this diameter is determined essentially by the height of the return passage. In the known screw spindle drives, the height of the return passage corresponds approximately to one and a half times the ball diameter, since the depth of the thread grooves in the spindle is only a little smaller than the radius of the balls. So that the balls can be lifted at any given time out of a thread groove and over the rib present between the two thread grooves, the return passage must have the height mentioned. The large pitch of the thread grooves furthermore has the disadvantage that the return passage, in which the balls are returned by one pitch into the preceding thread groove within a comparatively small circumferential angle, must be inclined to a comparatively great extent in the opposite direction to the thread grooves. Since no transmission of force in the axial direction can take place between the nut and screw spindle in the region of the return passage, it is endeavoured to accommodate this return passage in a circumferential angle which is as small as possible. The marked pitch of the return passage has the disadvantage that a marked deflection of the balls takes place in this passage, which has associated with it a correspondingly heavy wear and also the development of noise. Particularly because of their large overall axial length, a plurality of nuts cannot be arranged in series in the known screw spindle drives, since this would result in too great a total length. Such an arrangement of a plurality of nuts in series may be desirable, however, in order to achieve freedom from play by mutual pre-stressing of the nuts and also to multiply the load-bearing capacity of the nuts.

The problem underlying the invention is to avoid the above disadvantages and provide a screw spindle drive which in conjunction with a large ball diameter has a small pitch and consequently a large load-bearing capacity and the nut of which has a smaller over-all size and which is cheap to produce.

According to the invention, this is achieved in that the pitch of the thread grooves of the screw spindle and nut is smaller than the diameter of the balls.

For a certain ball diameter, the novel screw spindle drive may have any desired pitch which is smaller than the ball diameter.

As a result of this construction, optimum utilization of space for the surfaces rolling on one another is achieved. Neither on the spindle nor on the nut are any parts not serving as rolling surfaces present between the individual thread grooves, so that an optimum over-all length can be obtained for the nut. In screw spindle drives having a ball return means the over-all radial dimension of the nut also becomes altogether smaller. In fact, in the screw spindle drive according to the invention, the depth of the thread grooves is substantially smaller than the radius of the balls. Consequently, the depth of the return passage needs to be only slightly larger than the ball diameter, which again ultimately results advantageously in a small external diameter of the nut. The balls, which are relatively large in diameter in comparison with the pitch, have a lower contact pressure than smaller balls and consequently give the drive a higher load-bearing capacity with a lower degree of wear than would be present in a screw spindle drive of known type with the same pitch, but with smaller balls. Since the thread grooves in the new screw spindle drive are less deep than in known screw spindle drives, less metal-removal work by cutting is necessary for producing them, so that the new drive is also cheaper to manufacture. In this connection, the larger ball diameter likewise has an advantageous effect, because the thread grooves, the radius of which corresponds to that of the balls, also have a larger radius and are consequently simpler to grind than thread grooves of smaller radius such as would be necessary for balls having smaller diameters. In particular because of the smaller axial length of the nut, as many nuts as desired can be arranged in series by the unit part assembly technique, the total length of this arrangement being kept within permissible limits. Basically, the unit part assembly technique makes possible the mass production of separate nuts of the same kind in large numbers. One or more nuts are arranged in series according to the desired load-bearing capacity of the screw spindle drive. If it is desired to achieve freedom from play, it is sufficient if this unit, by which the desired load-bearing capacity in one direction is achieved, is opposed by only a single nut for pre-stressing. In known drives, on the other hand, the axial length of the prestressing nut also always corresponds to the axial length of the actual load-bearing nut. Furthermore, the new screw spindle drive also operates with particularly low wear and noise. In fact, if the pitch is smaller than the thread diameter, a smaller pitch is also obtained in the return passage and, consequently, a smaller deflection of the balls than in previous drives.

In a screw spindle drive having a ball return means, there is provided in the nut an insert piece having a return passage open towards the spindle and by which the balls are returned at any given time to the preceding thread groove. In such screw spindle drives, the axial length of the nut advantageously corresponds approximately to twice the ball diameter. In this way, a small over-all length of the nut is obtained.

In order to reduce this over-all axial length still further, it is advantageous if the axial length of the nut is only slightly greater than the sum of one pitch of the thread grooves and one ball diameter. The slightly greater length of the nut compared with the said sum is due to the special design of the insert piece with the return passage.

According to the invention, screw spindle drives without a ball return means are so designed that the balls are in mutual contact and are arranged at any given time in the form of a closed ring of balls, the last ball in one thread groove being in contact with the first ball in the adjacent thread groove.

In addition to the above-mentioned advantages, further advantages are also obtained. As a result of the elimination of ball return means, the over-all radial dimension of the nut also becomes altogether smaller. Owing to the fact that the last ball in one thread groove is in contact with the first ball in the adjacent thread groove, the balls cannot move apart. A ball cage can therefore be dispensed with and the balls can be arranged lying closely against one another, which likewise contributes towards an increase in the load-bearing capacity in consequence of the increase in the number of balls. Moreover, there is no danger of individual balls running prematurely against the end stops, so that the ease of action of the drive is ensured at all times, with the avoidance of unnecessary wear.

In a double or multi-thread screw spindle drive, the problem underlying the invention is solved in that in the case of a double or multi-thread screw spindle drive without ball return means the lead of the thread grooves of the screw spindle and nut is smaller than twice, or a multiple of, the diameter of the balls and the balls of two adjacent rows interengage alternately in contact with each other. In this way, substantially the same advantages are obtained in double or multi-thread screw spindle drives as in a single-thread screw spindle drive. As a result of the interengagement of the balls of two adjacent thread grooves, moving apart of the balls is prevented.

The invention is described in detail hereinafter with reference to several embodiments shown in the drawings.

BRIEF DESCRIPTION OF THE DRAWINGS

In the drawings:

FIG. 5 is a partial end view of a second embodiment having ball return means;

FIG. 6 shows this embodiment in section;

FIG. 7 is an inside view of this embodiment in the direction of the arrow VII in FIG. 6;

FIG. 8 shows a first embodiment of an assembly device in section on the line VIII—VIII in FIG. 9;

FIG. 9 is a front view of this embodiment;

FIG. 10 shows a combination of a screw spindle with a plurality of like nuts;

FIG. 11 is an axial section through a single-thread screw spindle drive without ball return means with a ring of balls;

FIG. 12 shows the same screw spindle drive with two rings of balls;

FIG. 13 is an axial section through a double-thread screw spindle drive without ball return means;

FIG. 14 shows an assembly aid for screw spindle drives.

DETAILED DESCRIPTION

Figure 1:
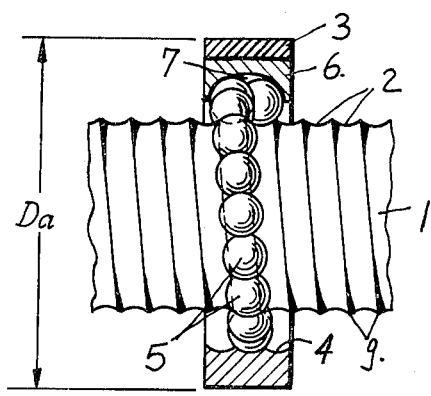
FIG. 1 is an axial section on the line I—I of FIG. 2 through a first embodiment of the new screw spindle drive having ball return means.
Figure 2:
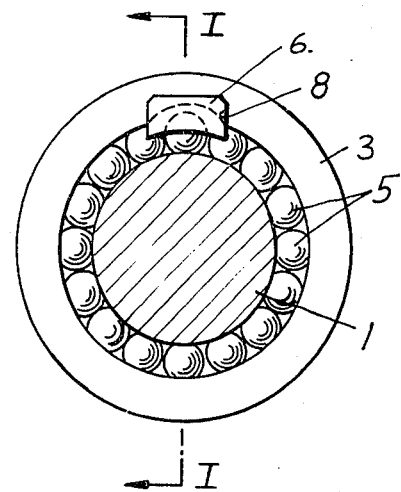
FIG. 2 is an end view of this embodiment with the screw spindle in section.

In the drawing, the reference 1 designates the screw spindle, which is provided with thread grooves 2. The thread grooves have a circular cross-section or, more precisely, the cross-section of a circular segment. The nut 3 is provided with complementary thread grooves 4. Moreover, the screw spindle drive has a plurality of balls 5 which are disposed in the form of a closed ring in the ball raceway formed by the thread grooves 2, 4 of the screw spindle 1 and the nut 2. In the embodiments shown in FIGS. 1 to 4 and 8 and 9, the balls are arranged following one another in close sequence, i.e. they are in mutual contact with each other. The nut 3 moreover has on its inside facing the screw spindle 1 an axial groove 8 into which an insert piece 6 is cemented. This insert piece 6 has a return passage 7, the slope of which runs in the opposite direction to the slope of the thread grooves 4 in the nut 3, the return passage having, however, over a comparatively small circumferential angle the same slope as the thread grooves 4 have for a complete turn. The balls 5 are returned by the return passage 7 in each case after a revolution to the preceding thread grooves 2 and 4, respectively, of the screw spindle 1 and the nut 3, being pushed over the rib 9 present between two thread grooves 2 of the screw spindle 1.

Figure 3:
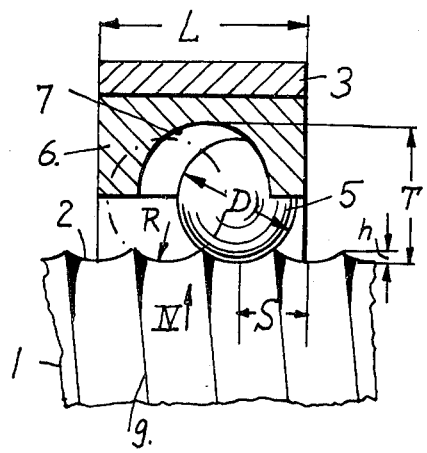
FIG. 3 shows details of the nut in axial section on a larger scale.
Figure 4:
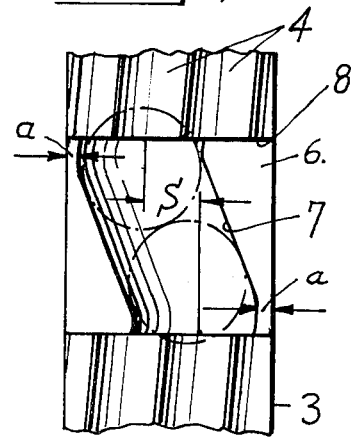
FIG. 4 is an internal view of the nut in the direction of the arrow IV in FIG. 3.

As can be seen furthermore from the drawing, and in particular from FIG. 3, the pitch S of the thread grooves 2 of the screw spindle, and also of the thread grooves 4 of the nut, is smaller than the diameter D of the balls 5. The axial length L of the nut corresponds approximately to twice the ball diameter D. The smallest possible length L of the nut is likewise apparent from FIG. 3 and in particular from FIG. 4. It is slightly greater than the sum of one pitch S of the thread grooves and one ball diameter D. The length L is greater by twice the amount $a$ than the amount by which the insert piece 6 must extend in the axial direction over the path of movement of the balls, so that these may be securely gripped and deflected into the preceding thread groove. Owing, however, to the fact that the pitch is smaller than the ball diameter, a maximum axial length of the nut which is approximately twice the ball diameter is obtained.

As can moreover be seen from the drawing, the small pitch S, which is smaller than the ball diameter, has the advantage that the thread grooves 2, 4 are comparatively shallow and have a comparatively large radius R corresponding to half the ball diameter D. This has advantages from the production aspect, because the shallow thread grooves require less metal removal work by cutting and the larger radius R can be more easily ground than smaller radii. Moreover, a particularly small external diameter Da of the nut is also achieved. In fact, the external diameter Da of the nut 3 is substantially dependent on the height of the insert piece 6 and the height of the latter again is dependent on the depth T of the return passage 7 which extends from the bottom of the thread grooves 2 of the spindle 1 to the bottom of the return passage 7. The depth T must moreover be greater than the ball diameter D by the height $h$ by which the rib 9 projects above the bottom of the thread grooves 2. Therefore, the flatter the thread grooves 2, i.e. the smaller their pitch S, the smaller also does the external diameter Da of the nut become.

Since the assembly of the spindle, nut and balls is not entirely simple, the screw drive has heretofore always been supplied complete. However, since particularly small dimensions are obtained for the nut in the drive according to the invention, this nut is suitable for a technique of unit or prefabricated part assembly. It is desirable in this connection that the user of the drive be able as far as possible to fit the nut himself, so that he obtains only the nuts from the manufacturer and, circumstances permitting, makes the spindles himself. In order to facilitate the fitting of the nuts, in accordance with FIGS. 8 and 9 a retaining ring 10 having a plurality of retaining fingers 11 projecting on one side in the axial direction is advantageously provided concentric with the nut. As can be seen from FIG. 9, the retaining fingers are arranged with a diameter which is only slightly greater than the diameter Ds of the screw spindle. Since the thread grooves 2 in the screw drive according to the invention have only a comparatively small depth $h$, the diameter Ds of the spindle is also only slightly greater than the diameter of the thread grooves at the bottom or base thereof. In this way, the retaining fingers 11 can engage in the gaps present between the balls 5, the balls, however, mutually touching one another at their diameters. After the assembly of the nut and spindle, the retaining ring 10 is removed and, if necessary, on the drive being taken apart again, can be inserted with its retaining fingers 11 again in the gaps present between the balls. In order to facilitate the removal of the retaining ring, it can be split if necessary, so that after it has been withdrawn from the nut it can be removed from the spindle by bending it open. In addition to the simplified fitting, a retaining ring designed in this way also has the advantage of ensuring the installation of the largest possible number of balls and thereby a high load-bearing capacity of the drive. Since the retaining ring is removed after the assembly of the nut and spindle, no additional frictional loss caused by the retaining ring occurs.

As shown in FIGS. 5 to 7, it would also be conceivable, however, to provide a substantially cylindrical retaining ring 12 the diameter of which is smaller than the mean diameter on which the centres of the balls move. The axial length of the retaining ring 12 corresponds substantially to the axial length of the nut 3. For each ball the retaining ring 12 has a slotted hole 13 extending in the axial direction and the width B of which in the circumferential direction is a little smaller than the ball diameter D. The retaining ring 12 holds the balls 5 in the nut 3 before and during the operation of assembly.

The construction of a drive free from play and of great load-bearing capacity will be described with reference to FIG. 10. Owing to the small axial and radial dimensions to which it is constructed, the nut 3 of the screw drive according to the invention is in fact particularly suitable for the construction of such a drive on the unit parts principle. Let it be assumed that the nut arrangement of this assembled drive is securely clamped in a housing and a great force which is five times as great as the load-bearing capacity of a single nut 3 acts on the spindle in the direction A. The force to be transmitted in the opposite direction is to be smaller than the load-bearing capacity of a nut and the drive is moreover to operate free from play. The nuts 3.1 to 3.5 are provided for transmitting the force $a$. In order to take up the play, these five nuts are prestressed with respect to a single nut 3.6. Let it be assumed that this initial stress in the axial direction is to be 50 kp. In this case, the nuts 3.6 and 3.1 are then prestressed against one another with a force of 50 kp. The nut 3.2 bears against the nut 3.1 with an initial stress of 40 kp. Since, however, the initial stress acts in the same direction, the balls of the nut 3.1 are somewhat relieved of load, so that they only have to transmit an initial stressing force of 10 kp. In the same way, the nut 3.3 bears with an initial stress of 30 kp and the nuts 3.4 and 3.5 bear with an initial stress smaller in each case by 10 kp against the preceding nuts. In this way, five load-bearing nuts 3.1 to 3.5 are prestressed with a comparatively short lock nut 3.6 and a particularly short over-all length is obtained.

FIGS. 11 to 13 show three embodiments of screw spindle drives without ball return means. In the embodiments shown in FIGS. 11 and 12, the screw spindle 1 has single thread grooves 2. The nut 3' surrounding the screw spindle concentrically has complementary thread grooves 4. In the ball raceway formed by the thread grooves 2 and 4 of the screw spindle 1 and the nut 3' there is disposed a ring of balls 5 which are in mutual contact. The radius of curvature R of the thread grooves 2, 4 corresponds to half the ball diameter D. The pitch S of the thread grooves is smaller than the diameter D of the balls. In this way, the balls 5 have a portion projecting at any given time into the adjacent thread groove. The last ball 5b in one thread groove is in contact with the first ball 5a in the adjoining thread groove. Irrespective of the direction in which the spindle 1 and nut 3' turn with respect to one another, it is always ensured in this way that the balls of a ring of balls do not move apart. In this connection, a ring of balls should have only such a number thereof that these balls make up a complete circle. In fact, with more balls, the moving apart of which would likewise be prevented in principle, a certain jamming may occur from experience between the balls of adjacent grooves.

If still more balls are to be provided in order to increase the load-bearing capacity then, as shown in FIG. 12, a further ring of balls (or if necessary, even more) comprising the balls 5' may be provided. In this case, the first ball 5'a of the further ring of balls is arranged in a thread groove 2 which adjoins that thread groove 2 in which the last ball 5b of the previous ring of balls rolls.

In the case of the embodiment shown in FIG. 13, a double-thread drive is concerned. The spindle 21 has thread grooves 22 and 22a which form a double-thread drive with the lead S2. In a double-thread drive, this lead S2 is smaller than twice the diameter D of the balls 25 and 25a. The nut 23 is equipped with complementary double thread grooves 24 and 24a, respectively. For clarity, the thread grooves 22 and the balls 25 associated with them are each shown dark in order to distinguish them from the adjacent thread grooves 22a and the balls 25a associated with these thread grooves. As can be seen from the drawing, the balls 25, 25a of two adjacent thread grooves 22, 22a interengage alternately in contact with each other, whereby moving apart of the balls is likewise prevented and they are always held together in the form of two rings which run in different thread grooves 22, 22a. In a multi-thread screw spindle drive, for example in a triple-thread drive, the lead would have to be chosen smaller than three times the ball diameter, while in a quadruple-thread drive it would have to be chosen smaller than four times the ball diameter, etc.

FIG. 14 shows another assembly aid which can be employed in screw spindle drives with and without ball return means. This assembly aid consists of a wedge 16 which is inserted between two adjacent balls 5 before the nut 3 is mounted on the spindle 1. All the balls 5 in mutual contact with each other are forced against one another by this wedge 16 and in this way the play between the balls 5 is eliminated. Since the balls 5 moreover mutually contact each other at points whose distance from one another is somewhat smaller than the ball diameter, the balls mutually wedge each other and cannot fall back radially inwardly. The wedge 16 is advantageously held against the nut 3 by means of a clip 17 of resilient material until it has been screwed onto the spindle 1 together with the ring of balls. The wedge 16 is then removed. This simple wedge consequently facilitates the mounting of the nut 3 and balls 5 on the spindle 1 very substantially.

I claim:

1. In a screw spindle drive comprising a screw spindle having at least one thread groove of circular cross section, a nut having a thread groove complementary to said thread groove on said screw spindle to form a ball raceway therebetween, and a closed ring of equal diameter balls in said ball raceway, the improvement comprising wherein the pitch of said thread groove on said screw spindle is less than the diameter of each of said balls.

2. The improved screw spindle drive as claimed in claim 1, wherein said screw spindle and said nut have a single ball raceway, wherein said nut includes return passage means opening towards said spindle and inclined in the opposite sense to said raceway to return said balls from one turn of the raceway into the preceding turn.

3. The improved screw spindle drive as claimed in claim 2, wherein said nut includes an insert piece and wherein said return passage means is formed in said insert piece.

4. The improved screw spindle drive as claimed in claim 2, wherein the axial length of said nut is greater than the sum of said ball diameter and said pitch of said thread groove and not greater than twice said ball diameter.

5. The improved screw spindle as claimed in claim 2 including a retaining ring concentric with said nut and having a ring of retaining fingers projecting axially from one side thereof and engaging between said balls, the diameter of said ring of retaining fingers being greater than the diameter of said screw spindle.

6. The improved screw spindle drive as claimed in claim 2 including a cylindrical retaining ring coaxial with said nut and having a diameter smaller than the mean diameter on which the centers of said balls move, said retaining ring having for each ball an axially-extending slot with a width in the circumferential direction which is a little smaller than said ball diameter.

7. The improved screw spindle drive as claimed in claim 1, wherein said screw spindle and said nut have a single ball raceway, wherein said balls of said closed ring are in mutual contact and the last ball in one turn of the raceway is in contact with first ball in the adjacent turn of the raceway.

8. The improved screw spindle drive as claimed in claim 7 including a further ring of balls in the same raceway, the first ball of the further ring being arranged in a turn of the raceway adjacent to that in which the last ball of said first ring rolls.

9. The improved screw spindle drive as claimed in claim 1 including a wedge inserted between two adjacent balls to eliminate the the play between all the balls in mutual contact with one another before the nut is mounted on the spindle, the wedge being removed after the mounting of the nut on the spindle.

10. The improved screw spindle drive as claimed in claim 1, wherein said screw spindle and said nut have a plurality of ball raceways with separate rings of balls, said balls in adjacent turns of two raceways interengaging alternately with one another.

11. In a screw spindle drive comprising a screw spindle having plural thread grooves of circular section, a nut having plural thread grooves complementary to said thread grooves on said screw spindle to form a plurality of coextensive ball raceways therebetween, and plural closed rings of equal diameter balls in said ball raceways, the improvement comprising wherein said pitch is less than the result obtained by multiplying the diameter of one of said balls by the number of ball raceways.

* * * * *